United States Patent
Matsuba et al.

(10) Patent No.: US 11,741,685 B2
(45) Date of Patent: Aug. 29, 2023

(54) COMMODITY IDENTIFICATION DEVICE, NON-TRANSITORY COMPUTER-READABLE STORAGE MEDIUM, AND LEARNING METHOD

(71) Applicant: Shiseido Company, Ltd., Tokyo (JP)

(72) Inventors: Seiji Matsuba, Tokyo (JP); Sousuke Shimoyama, Tokyo (JP); Masanori Fukuda, Tokyo (JP); Tomochika Fujioka, Tokyo (JP); Akihito Torii, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 366 days.

(21) Appl. No.: 15/733,994

(22) PCT Filed: Jun. 6, 2019

(86) PCT No.: PCT/JP2019/022436
§ 371 (c)(1),
(2) Date: Dec. 1, 2020

(87) PCT Pub. No.: WO2019/235554
PCT Pub. Date: Dec. 12, 2019

(65) Prior Publication Data
US 2021/0217160 A1    Jul. 15, 2021

(30) Foreign Application Priority Data
Jun. 7, 2018   (JP) .................. 2018-109429

(51) Int. Cl.
*G06V 10/20*    (2022.01)
*G06T 7/11*     (2017.01)
(Continued)

(52) U.S. Cl.
CPC .......... *G06V 10/255* (2022.01); *G06T 7/0008* (2013.01); *G06T 7/11* (2017.01);
(Continued)

(58) Field of Classification Search
CPC .... G06V 10/255; G06V 10/454; G06V 10/60; G06V 10/764; G06V 10/82; G06V 20/52;
(Continued)

(56) References Cited

U.S. PATENT DOCUMENTS

2016/0260014 A1*   9/2016   Hagawa ............ G06F 18/24317
2017/0255648 A1    9/2017   Dube et al.
(Continued)

FOREIGN PATENT DOCUMENTS

| JP | 2015-210651 A | 11/2015 |
|----|---------------|---------|
| JP | 2017-084320 A | 5/2017 |
| JP | 6209717 B1    | 10/2017 |

OTHER PUBLICATIONS

English Translation of International Search Report for PCT Application No. PCT/JP2019/022436 dated Aug. 20, 2019, 1 page.

*Primary Examiner* — Bobbak Safaipour
(74) *Attorney, Agent, or Firm* — Bret E. Field; Bozicevic, Field & Francis LLP

(57) ABSTRACT

A commodity identification device is provided with: one or more processing devices; and one or more storage devices storing instructions for causing the one or more processing devices to: obtain a taken image; determine whether a commodity is provided with a corresponding mark or not by using a mark detector on the obtained taken image; identify which of a plurality of commodity groups a commodity provided with the mark belongs to by using a first neural network having learned the commodity, on the taken image where the mark is detected; and identify the commodity by using a second neural network having performed learning for each of the commodity groups.

6 Claims, 11 Drawing Sheets

(51) Int. Cl.
*G06T 7/00* (2017.01)
*G06V 10/764* (2022.01)
*G06V 10/82* (2022.01)
*G06V 10/44* (2022.01)
*G06V 10/60* (2022.01)
*G06V 20/52* (2022.01)

(52) U.S. Cl.
CPC ............ *G06V 10/454* (2022.01); *G06V 10/60* (2022.01); *G06V 10/764* (2022.01); *G06V 10/82* (2022.01); *G06V 20/52* (2022.01); *G06T 2207/20081* (2013.01); *G06T 2207/20084* (2013.01); *G06T 2207/30204* (2013.01); *G06V 2201/07* (2022.01)

(58) Field of Classification Search
CPC ..... G06V 2201/07; G06T 7/0008; G06T 7/11; G06T 2207/20081; G06T 2207/20084; G06T 2207/30204
See application file for complete search history.

(56) References Cited

U.S. PATENT DOCUMENTS

| | | | |
|---|---|---|---|
| 2018/0060935 A1* | 3/2018 | Dhua | G06F 16/583 |
| 2018/0307942 A1* | 10/2018 | Pereira | G06T 7/337 |
| 2019/0073562 A1* | 3/2019 | Stolikj | G06F 18/24143 |
| 2020/0218938 A1* | 7/2020 | Stolikj | G06V 40/172 |
| 2022/0335256 A1* | 10/2022 | Saraee | G06V 10/82 |

* cited by examiner

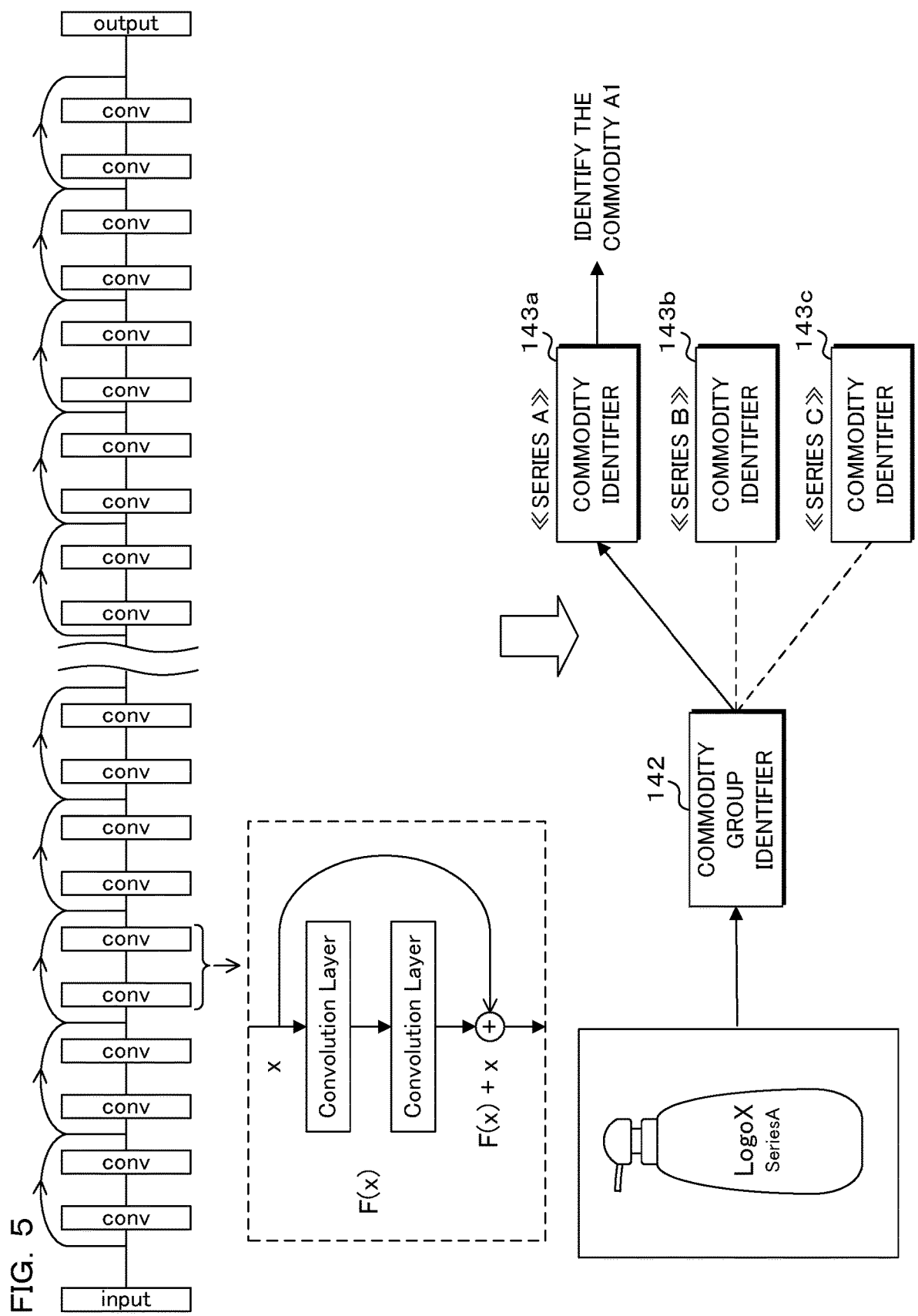

COMMODITY IDENTIFICATION DEVICE, NON-TRANSITORY COMPUTER-READABLE STORAGE MEDIUM, AND LEARNING METHOD

CROSS-REFERENCE TO RELATED APPLICATIONS

This application is the national phase under 35 U.S.C. § 371 of PCT international Application No. PCT/JP2019/022436 which has an International filing date of Jun. 6, 2019 and designated the United States of America.

FIELD

The present invention relates to a commodity identification device, a non-transitory computer-readable storage medium, and a learning method.

BACKGROUND

A technique is available in which an imaged commodity is identified by performing image recognition on a taken image obtained by imaging a commodity.

For example, Japanese Patent No. 6209717 discloses an information processing system and the like in which by using a recognition model by deep learning, a preregistered commodity is recognized from a taken image and by further checking the size and color of the commodity; the commodity is accurately identified.

SUMMARY

However, the invention according to Japanese Patent No, 6209717 is based on the premise that the imaged object is any of the preregistered commodities. Therefore, there is a problem in that when an unregistered commodity is imaged, the commodity is forcibly classified as any of the registered commodities.

According to one aspect, an object is to provide a commodity identification device and the like capable of appropriately identifying a commodity from a taken image.

A commodity identification device according to one aspect is provided with: one or more processing devices; and one or more storage devices storing instructions for causing the one or more processing devices to: obtain a taken image; determine whether a commodity is provided with a corresponding mark or not by using a mark detector on the obtained taken image; identify which of a plurality of commodity groups a commodity provided with the mark belongs to by using a first neural network having learned the commodity, on the taken image where the mark is detected; and identify the commodity by using a second neural network having performed learning for each of the commodity groups.

A non-transitory computer-readable storage medium according to one aspect causes a computer to execute processing of obtaining a taken image; determine whether a commodity is provided with the mark or not by detecting a corresponding mark from the obtained taken image; identifying which of a plurality of commodity groups the commodity provided with the mark belongs to by using a first neural network having learned the commodity, on the taken image where the mark is detected; and identifying the commodity by using a second neural network having performed learning for each of the commodity groups.

A learning method according to one aspect causes a computer to execute processing of: obtaining training data including an image for teachers obtained by imaging a commodity and information representative of the commodity, a commodity group to which the commodity belongs and a mark possessed by the commodity; and generating identifiers that identify the commodity, the commodity group and the mark, respectively, based on the training data.

According to one aspect, the commodity can be appropriately identified from the taken image.

BRIEF DESCRIPTION OF THE DRAWINGS

FIG. 5 An explanatory view for explaining the mark identification processing.

FIG. 6 An explanatory view showing an example of a commodity identification screen.

DETAILED DESCRIPTION

Hereinafter, the present disclosure will be described in detail based on the drawings showing an embodiment thereof.

(Embodiment)

Figure 1:
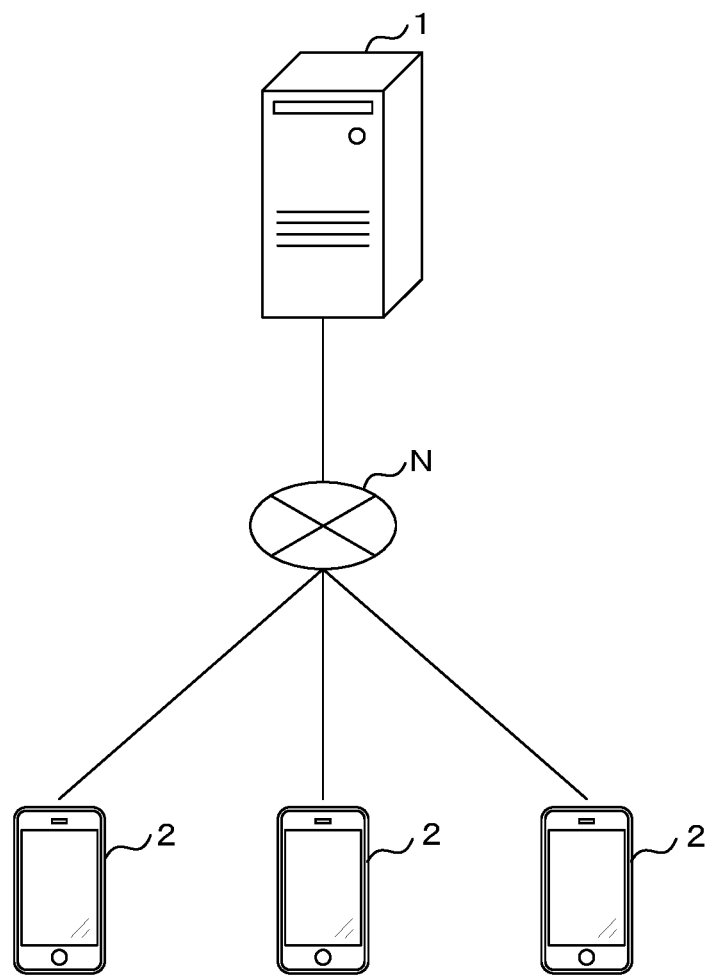
FIG. 1 A schematic view showing a configuration example of a commodity identification system.

FIG. 1 is a schematic view showing a configuration example of a commodity identification system. In the present embodiment, the commodity identification system will be described in which from a taken image of a commodity imaged by the user, the commodity included in the image is identified. The commodity identification system has a commodity identification device 1 and terminals 2. The commodity identification device 1 and the terminals 2 are connected so as to communicate with one another through a network N such as the Internet.

The commodity identification device 1 is an information processing device capable of various kinds of information processing and information transmission/reception, and is, for example, a server device or a personal computer. In the present embodiment, the commodity identification device 1 is a server device, and will be read as server 1 in the following for the sake of brevity. The server 1 performs the processing to identify, from a taken image obtained by imaging a commodity; the commodity in the image. Specifically, the server 1 performs machine learning processing to learn feature amounts of the commodity from the commodity image for teachers, and constructs a learning model for identifying the commodity from the image. With reference to the learning model, the server 1 identifies the commodity included in the image taken by the user.

The terminals 2 are terminal devices possessed by individual users, and are, for example, smartphones, tablet terminals or personal computers, The present embodiment will be described with the terminals 2 as smartphones having an imaging function The terminals 2 each image a commodity according to an operation by the user and transmit the taken image to the server 1. The server 1 performs image recognition on the images obtained from the terminals 2 and identifies the commodities.

Figure 2:
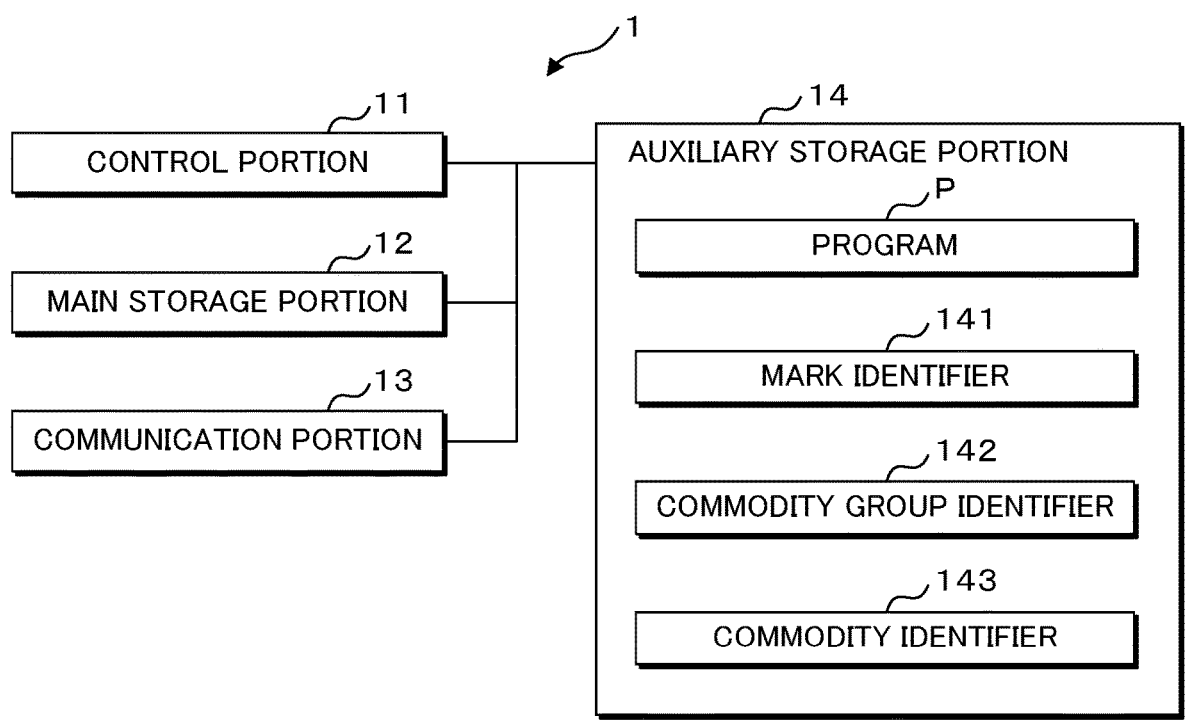
FIG. 2 A block diagram showing a configuration example of a server.

FIG. 2 is a block diagram showing a configuration example of the server 1. The server 1 is provided with a control portion 11, a main storage portion 12, a communication portion 13 and an auxiliary storage portion 14.

The control portion 11 has one or more arithmetic processing units such as CPUs (Central Processing Units), MPUs (Micro-Processing Units) or GPUs (Graphics Processing Units), and performs various kinds of information processing, control processing and the like related to the server 1 by reading and executing a program P stored in the auxiliary storage portion 14. The main storage portion 12 is a temporary storage area such as an SRAM (Static Random Access Memory), a DRAM (Dynamic Random Access Memory) or a flash memory, and temporarily stores data necessary for the control portion 11 to execute the arithmetic processing. The communication portion 13 includes a processing circuit and the like for performing processing related to communication, and performs information transmission and reception with the terminals 2 and the like.

The auxiliary storage portion 14 is a high-capacity memory, a hard disk or the like, and stores the program P necessary for the control portion 11 to execute processing and other pieces of data. Moreover, the auxiliary storage portion 14 stores data of the learning model constructed by the machine learning processing. Specifically, the auxiliary storage portion 14 stores: a mark identifier (mark detector) 141 for detecting a mark affixed to the commodity container from the image obtained by imaging the commodity; a commodity group identifier 142 (first neural network) for identifying to which of a plurality of predetermined commodity groups the imaged commodity belongs; and a commodity identifier 143 (second neural network) for identifying concrete individual commodities. The server 1 performs the processing to identify a commodity from the taken image by using the identifiers.

The auxiliary storage portion 14 may be an external storage device connected to the server 1. Moreover, the server 1 may be a multi-server consisting of a plurality of computers or may be a virtual machine virtually constructed by software.

In the present embodiment, the structure of the server 1 is not limited to the above-described one; for example, it may include an input portion that accepts an operation input, a display portion that displays information related to the server 1 and a reading portion that reads information stored in a portable storage medium.

Figure 3:
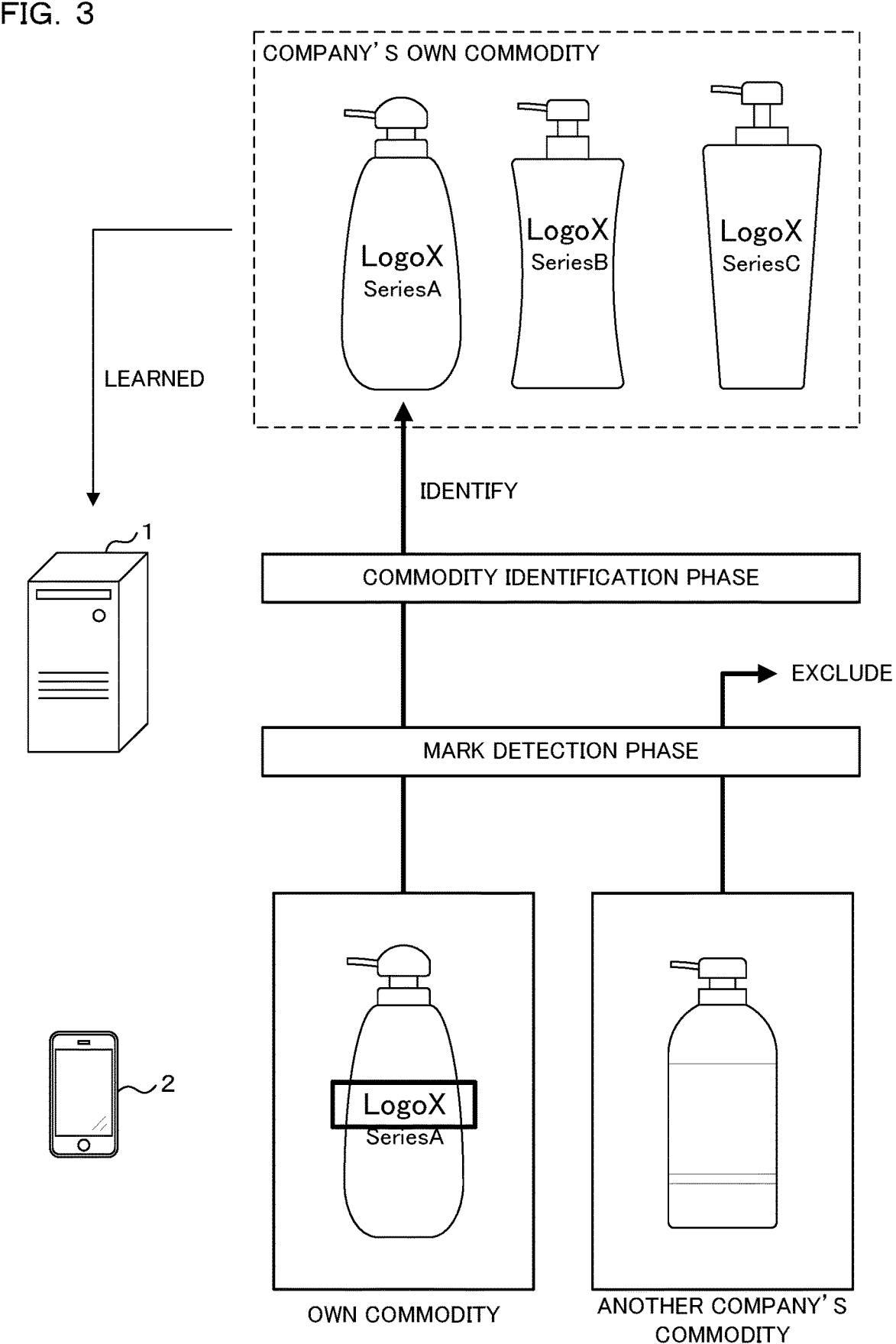
FIG. 3 An explanatory view showing a general outline of the present embodiment.

FIG. 3 is an explanatory view showing a general outline of the present embodiment. FIG. 3 illustrates a manner in which the server 1 having learned the image feature amounts for a predetermined commodity identifies the commodity in an image transmitted from the terminal 2.

For example, the server 1 constructs a learning model by performing machine learning of learning feature amounts such as the color, shape and the like of the commodity container from the image data for teachers obtained by imaging a preregistered commodity (for example, the company's own commodity). The server 1 obtains the image data of the commodity imaged by the user from the terminal 2, and identifies to which of the preregistered specific commodities the commodity included in the taken image corresponds with reference to the learning model. For example, the server 1 provides the user with information on the identified commodity.

However, there can be cases where the user images an unregistered commodity (for example, another company's commodity). In these cases, the server 1 classifies the commodity of the taken image as any of the registered commodities. Thus, there is a possibility that the commodity is forcibly classified as any of the registered commodities and is erroneously identified when a large indefinite number of images are inputted.

Accordingly, the server 1 prevents the above-mentioned situation by performing preprocessing to exclude the images of unregistered commodities. Specifically the server 1 detects the mark affixed to the registered commodity from the taken image by using the mark identifier 141. When none of the marks of the registered commodities is detected, the server 1 excludes the image from the target of processing.

Figure 4A:
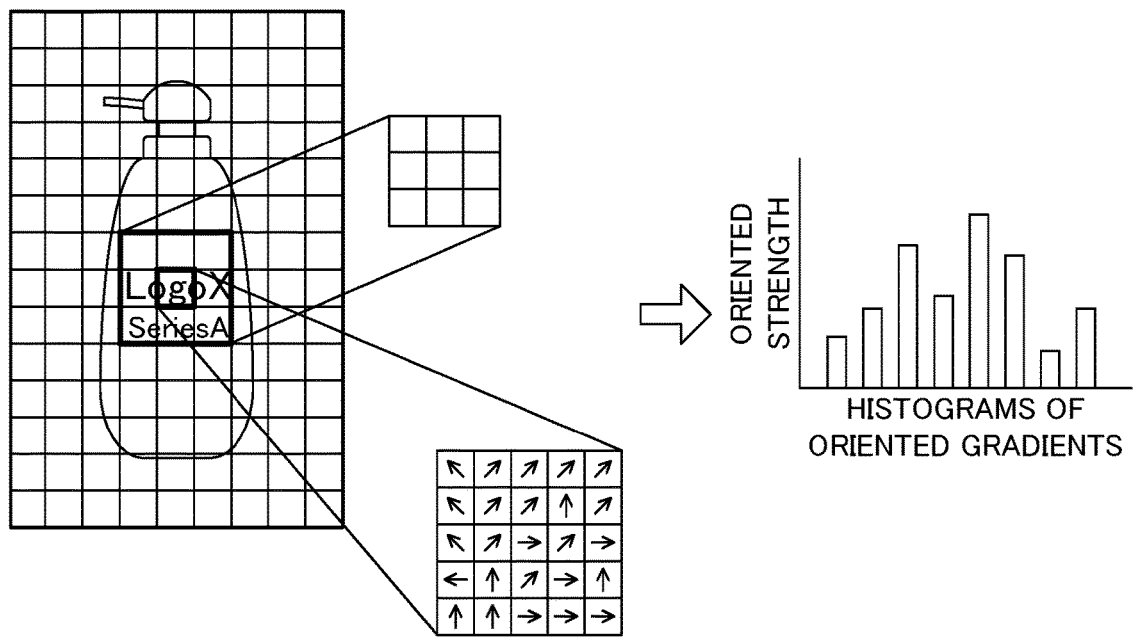
FIG. 4 An explanatory view for explaining mark identification processing.
Figure 4B:
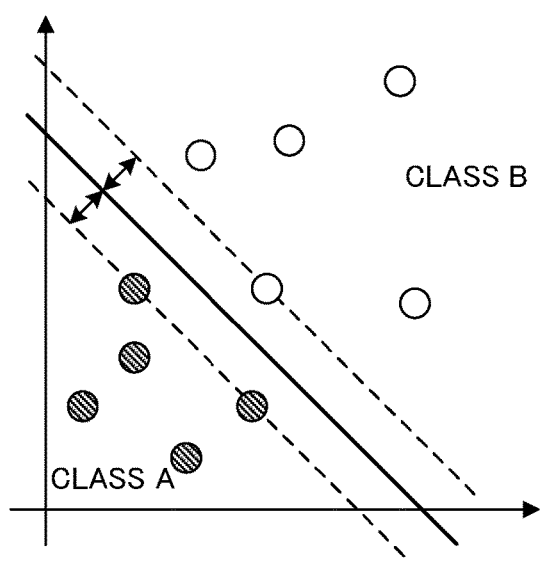

FIGS. 4A and 4B are explanatory views for explaining the mark identification processing. FIG. 4A illustrates a manner in which a local feature amount is extracted from the taken image. FIG. 4B illustrates a manner in which class classification of the extracted local feature amount is performed.

For example, the server 1 extracts the local feature amount representative of the gradient of the brightness from the taken image, and detects the mark affixed to the commodity container based on the extracted local feature amount. The local feature amount is, for example, a HOG (Histograms of Oriented Gradients) feature amount. The HOG feature amount is a feature amount in which the brightness gradient is expressed in the form of a vector by expressing, in the form of a histogram, the gradient direction of the brightness in a local area (cell) into which the taken image is divided in a predetermined unit. In the HOG feature amount, as shown in FIG. 4A, with 5×5 pixels as one cell and 3×3 cells as one block, the brightness gradient of one block is expressed in the form of a histogram of an eight-direction binary (the arrows shown in FIG. 4A). The structural units of the blocks and the cells are examples and may be arbitrarily changed. The binary expressing the gradient is not limited to eight directions. The HOG feature amount is characterized by being resistant to geometric changes and robust against variations in image illumination. In the present embodiment, the server 1 uses the HOG feature amount as the feature amount for identifying the mark.

For example, the server 1 identifies the mark by using an SVM (Support Vector Machines) algorithm based on the HOG feature amount. The SVM is a pattern recognition method using supervised learning, and is a method of class classification of input data (taken image). As conceptually shown in FIG. 4B, in the SVM, the data sample of each class (two classes in FIG. 4B) is projected into a multidimensional feature amount space and the identification surface where the distance (margin) from the nearest sample is maximum is obtained, thereby generating an identifier that performs class classification with the identification surface as the identification boundary. In the SVM, by using the identifier, in which of the spaces with the identification surface as the boundary the feature amount of the input data as the target of identification is situated is determined, thereby performing class classification.

In the present embodiment, the server 1 obtains (inputs) training data where the teacher image of the registered commodity the container of which is affixed with the mark is labeled with the correct value of the coordinate position of the mark part of the image. The mark is a so-called logo formed of characters, figures, symbols or the like, and is a mark to which consumers pay attention when identifying the commodity. As described in a modification described later, the "mark" in the present embodiment is not limited to a logo, and the structure of the commodity container or the like, that is, the shape of the commodity serving as a feature when consumers identify the commodity is also included in the mark. The server 1 extracts the HOG feature amount of the coordinate position defined by the training data from the teacher image, thereby expressing the brightness gradient of the mark part in the form of a multidimensional feature amount vector. Then, the server 1 projects the HOG feature amount of the mark part into a multidimensional feature space, and obtains the identification boundary where the margin is maximum, thereby generating the mark identifier 141 that identifies the mark from the HOG feature amount. When a taken image is obtained from the terminal 2, the server 1 detects the mark affixed to the commodity included in the image by using the mark identifier 141.

When the mark of the registered commodity is not detected from the taken image for a reason such that the mark of the registered commodity which is the target of learning at the time of the above-mentioned machine learning is not affixed to the imaged commodity or that although a mark is affixed, it is not the mark of the registered commodity, the server 1 determines that the commodity of the taken image is not a registered commodity and excludes it from the target of processing. For example, the server 1 notifies the terminal 2 that the mark detection is a failure, and ends the series of processing.

FIG. 5 is an explanatory view for explaining the commodity identification processing. When the mark detection is a success, the server 1 identifies to which of the registered commodities the commodity corresponds. Specifically the server 1 previously generates the commodity group identifier 142 and the commodity identifier 143 which are neural networks related to a ResNet (Residual Network), from the training data, and identifies each commodity by using each identifier.

The ResNet is a kind of neural network, and is characterized by having very deep layers and high in identification accuracy. In the upper side of FIG. 5, a conceptual schematic diagram of the ResNet is shown. The ResNet has a network configuration in which the residual between the input value and the output value is calculated every predetermined number of neuron layers (two layers in FIG. 5) and the calculated residual is inputted to the next layer as the input value. In the ResNet, the above-described residual. calculation is repeated up to the last layer (output layer). This suppresses problems such as gradient disappearance and gradient divergence caused when the number of layers is large, so that high identification accuracy can be ensured.

In the present embodiment, the ResNet-101 is adopted, and the server 1 generates identifiers having a neural network configuration having 101 neuron layers. More specifically the server 1 constructs identifiers of a CNN (Convolution Neural Network) model including a neuron layer executing a convolution operation. The server 1 identifies each commodity by using the generated identifiers.

Specifically the server 1 obtains (inputs) training data including the teacher image, the commodity group to which the registered commodity belong and information representative of the commodity itself, and generates the commodity group identifier 142 and the commodity identifier 143 from the training data. The commodity group is a classification of commodities the feature amounts of which are somewhat approximate such as commodities the containers of which are similar to one another because they belong to the same commodity brand that is serialized. The server 1 obtains the teacher image labeled with the correct value of the commodity group (for example, the name of the commodity group. Hereinafter, referred to as "series name"). The server 1 generates the commodity group identifier 142 by extracting feature amounts such as the color and shape of the commodity container or characters of the series name printed on the commodity container, from the teacher image.

Moreover, the server 1 generates the commodity identifier 143 that identifies individual commodities from the training data where the teacher image is labeled with information (for example, commodity names) by which individual commodities can be identified. In the present embodiment, the server 1 generates commodity identifiers 143a, 143b, 143c, . . . that are different among commodity groups. By learning the features of the individual commodities for each of the commodity groups having similar appearances and using a different commodity identifier 143 for each commodity group, the image recognition processing is not complicated, so that the accuracy can be enhanced.

The server 1 identifies commodities by using the above-described commodity group identifier 142 and commodity identifier 143. First, the server 1 inputs, to the commodity group identifier 142, the taken image where a mark is detected by the mark identifier 141, and identifies the commodity group. For example, the server 1 extracts, from the taken image, feature amounts related to the shape and color of the commodity container or characters printed on the commodity container, and identifies to which commodity group container the commodity container is close or which of the series names of the commodity groups is affixed. Thereby the server 1 identifies to which of the commodity groups the commodity of the taken image belongs.

After the identification of the commodity group, the server 1 identifies to which of the commodities the imaged commodity concretely corresponds, by using the commodity identifier 143 according to the commodity group. For example, as conceptually shown in the lower side of FIG. 5, when the series of the commodity is identified as "series A" by the commodity group identifier 142, the server 1. selects the commodity identifier 143a for identifying the commodities of "series A" as the identifier used for the commodity identification. The server 1 inputs the image data to the commodity identifier 143a and extracts feature amounts such as the color and shape of the commodity container or the characters printed on the commodity container, thereby identifying the imaged commodity as "commodity A1". As described above, the server 1 identifies individual commodities by using different commodity identifiers 143 according to the series (commodity groups) of the commodities.

Figure 6:
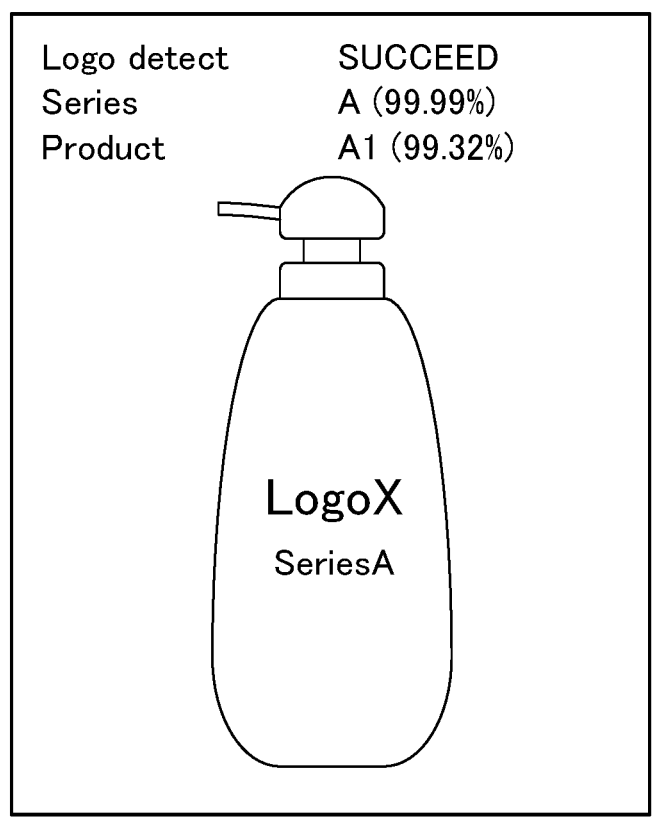
FIG. 6 An explanatory view for explaining commodity identification processing.

FIG. 6 is an explanatory view showing an example of a commodity identification screen. The server 1 outputs the commodity identification result, and the terminal 2 displays the commodity identification screen shown in FIG. 6. As shown in FIG. 6, the terminal 2 displays the result of the mark (logo) detection, the series name of the commodity and the commodity name together with the sample image of the identified commodity. The numbers affixed to the series name and the commodity name are the reliabilities calculated at the time of image recognition.

Although both the series name and the commodity name are displayed in FIG. 6, there can be cases where the server 1 fails in the recognition of individual commodities and cannot identify the commodity name such as when the reliability at the time of image recognition is not more than a predetermined threshold value. In this case, the server 1 causes the terminal 2 to display only the series name. Since the commodity group to be the target of the identification by the commodity group identifier 142 is such that commodity containers that are somewhat similar in appearance are collectively identified, the accuracy is higher than when each commodity is identified. By presenting at least the result of identification of this commodity group (series name) to the user, even when identification of individual commodities is a failure, the user can obtain commodity information based on the series name.

When the reliability at the time of commodity group identification is low and commodity group identification is a failure, the server 1 outputs, to the terminal 2, only the detection result of the mark detected from the taken image, and ends the series of image processing.

Figure 7:
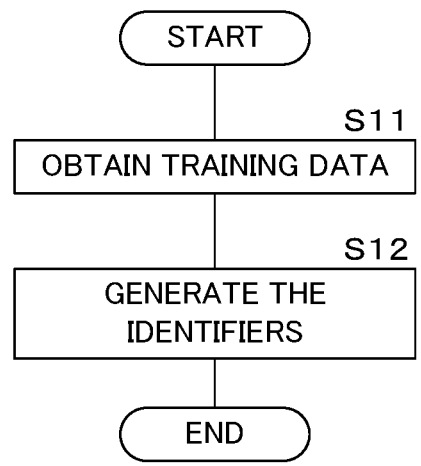
FIG. 7 A flowchart showing an example of the procedure of learning processing of a learning model.

FIG. 7 is a flowchart showing an example of the procedure of the learning processing of the learning model. Based on FIG. 7, the contents of the machine learning processing executed by the server 1 will be described.

The control portion 11 of the server 1 obtains training data including the teacher image where the commodity container of the commodity to be the target of learning is imaged, the mark affixed to the commodity container, the commodity group to which the commodity belongs and information representative of each commodity (step S11). The mark is a so-called logo formed, for example, of characters, figures or symbols. The commodity group is a classification of commodities the feature amounts of which are somewhat approximate such as a commodity brand that is serialized. The control portion 11 obtains training data for training where the correct values of the mark, the commodity group and the commodity itself are labelled on the commodity image. For example, the control portion 11 obtains training data labeled with information such as the coordinate position at which the mark is affixed to the commodity container, the series name of the commodity group to which the commodity belongs and the commodity name of each commodity.

The control portion 11 performs machine learning processing to extract feature amounts from the teacher image, and generates the identifiers that identify the mark, the commodity group and the commodity itself from the taken image, respectively (step S12). For example, the control portion 11 extracts the local feature amount (HOG feature amount) related to the brightness gradient of the coordinate position represented by the training data and obtains the identification boundary by projecting the extracted local feature amount into the feature space, thereby generating the mark identifier 141 capable of detection (class classification) of the mark affixed to the target commodity from the local feature amount. Moreover, the control portion 11 extracts feature amounts such as the color and shape of the commodity container or the characters affixed to the commodity and associates them with the information representative of the commodity group and the commodity itself (for example, the series name and the commodity name), thereby generating the commodity group identifier 142 and the commodity identifier 143 that identify the commodity group and the commodity from the feature amounts of the image. Specifically, the control portion 11 has the ResNet network configuration where calculation of the residual between the input value and the output value is repeated every predetermined number of neuron layers, and generates identifiers of the CNN model including a neuron layer that executes a convolution operation. The control portion 11 generates the commodity identifiers 143a, 143b, 143c, . . . that are different among commodity groups. The control portion 11 ends the series of processing.

Figure 8:
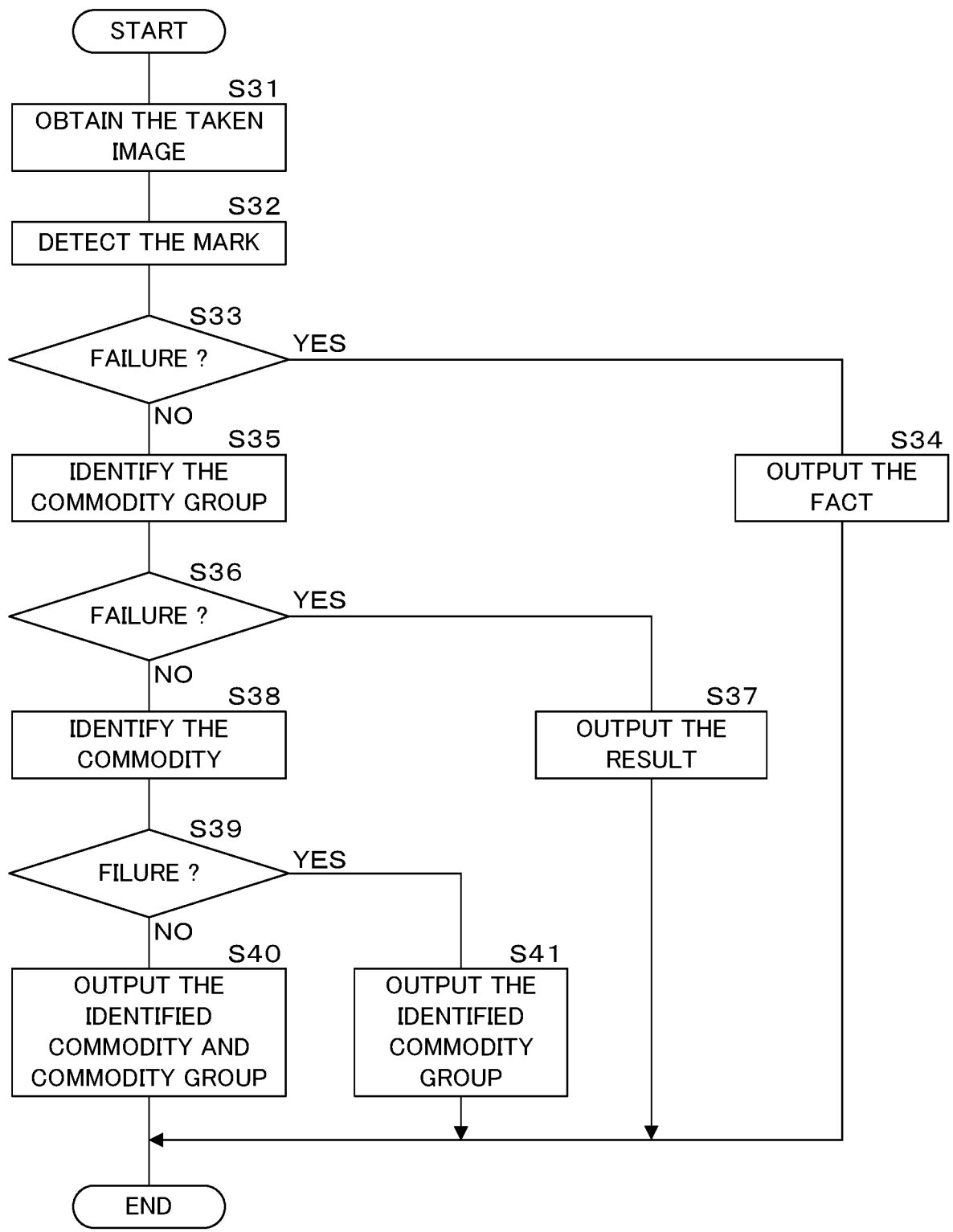
FIG. 8 A flowchart showing an example of the procedure of the commodity identification processing.

FIG. 8 is a flowchart showing an example of the procedure of the commodity identification processing. Based on FIG. 8, the contents of the commodity identification processing to identify the commodity based on the above-described learning model will be described.

The control portion 11 of the server 1 obtains, from the terminal 2, the taken image obtained by the user imaging the commodity container (step S31). On the taken image, the control portion 11 detects the mark affixed to the container of the commodity in the image by using the mark identifier 141 (step S32). Specifically, the control portion 11 divides the taken image into local areas of a predetermined unit, and extracts the local feature amount (HOG feature amount) representative of the brightness gradient of each local area. The control portion 11 determines in which of the spaces demarcated by the identification boundary in the feature space the extracted local feature amount is situated, thereby detecting the mark of the preregistered commodity.

The control portion 11 determines whether the detection of the mark is a failure or not (step S33). When the detection of the mark is a failure (S33: YES), the control portion 11 outputs, to the terminal 2, the fact that the mark detection is a failure (step S34), and ends the series of processing.

When the detection of the mark is not a failure (S33: NO), the control portion 11 identifies to which of a plurality of predetermined commodity groups the imaged commodity belongs by using the commodity group identifier 142 (first neural network) (step S35). The commodity group is a classification of commodities the feature amounts of which are somewhat appropriate such as brand commodities that are serialized. The control portion 11 identifies to which of the plurality of commodity groups the commodity of the taken image belongs, by using the commodity group identifier 142 which is a neural network related to the ResNet.

The control portion 11 determines whether the identification of the commodity group is a failure or not (step S36). For example, the control portion 11 performs the determination according to whether the reliability calculated at the time of image recognition is not more than a predetermined threshold value or not. When the identification of the commodity group is a failure (S36: YES), the control portion 11 outputs the result of the mark detection at step S32 to the terminal 2 (step S37), and ends the series of processing.

When the identification of the commodity group is not a failure (S36: NO), the control portion 11 identifies individual commodities by using the different commodity identifier 143 (second neural network) according to the identified commodity group (step S38). The commodity identifier 143 is a neural network related to the ResNet having learned feature amounts of individual commodities for each of a plurality of commodity groups. The control portion 11 inputs the taken image to a different neural network according to the commodity group identified at step S35, thereby identifying each commodity.

The control portion 11 determines whether the identification. of individual commodities is a failure at step S35 or not (step S39). For example, the control portion 11 performs the determination according to whether the reliability at the time of image recognition is not more than a predetermined threshold value or not. When the identification of the commodity is not a failure (S39: NO), the control portion 11 generates a commodity identification screen representative of the identified commodity and commodity group, and outputs it to the terminal 2 (step S40). Specifically, as shown in FIG. 6, the control portion 11 outputs it to a commodity identification screen showing the commodity name and the series name with the reliabilities affixed thereto. When the identification of the commodity is a failure (S39: YES), the control portion 11 outputs, to the terminal 2, a commodity identification screen showing only the commodity group (step S41). The control portion 11 ends the series of processing.

While the mark is detected by using the SVM method in the above, the mark may be detected by using an optical method such as OCR (Optical Character Recognition). That is, it is necessary only that the mark can be detected by image recognition, and the detection algorithm is not limited to the one by machine learning.

While the HOG feature amount is used as the feature amount used for the mark detection, for example, a feature amount such as SIFF or SURF may be used.

While the processing is executed not on the terminal 2 on the user side but on the server 1 on the cloud in the present embodiment, the data of the learning model may be installed onto the terminal 2 so that the series of identification processing is performed on the terminal 2.

From the above, according to the present embodiment, the server 1 first identifies the mark affixed to the commodity from the taken image, and then, identifies individual commodities. Marks are affixed to many commodities, and by narrowing down the target of processing based thereon, whether the object recognized from the taken image is the target commodity or not can be appropriately determined. Moreover, the server 1 identifies individual commodities after identifying the commodity group. As described above, by individually identifying commodities after roughly classifying them, the contents of learning are not complicated, so that accuracy can be improved. By the above, the commodity can be appropriately identified from the taken image.

Moreover, according to the present embodiment, the server 1 extracts the local feature amount (HOG feature amount) representative of the brightness gradient from the taken image, and detects the mark in the feature space by using the SVM method. For example, when the OCR technique is used, there is a possibility that normal recognition is difficult depending on conditions such as the material of the container surface (rough or mirror-smooth) and the design of the mark itself. On the other hand, by extracting the local feature amount and performing pattern recognition as in the present embodiment, the mark can be accurately detected.

Moreover, according to the present embodiment, by displaying, on the terminal 2, the commodity identification screen showing the commodity and the commodity group identified from the taken image, the user can easily obtain information on the commodity, so that appropriate service support can be offered.

Moreover, according to the present embodiment, even when the identification of a specific commodity is a failure, the commodity group (for example, the commodity brand) can be presented to the user, so that more appropriate service support can be offered.

(Modification)

In the above-described embodiment, the logo affixed to the commodity container is regarded as the mark, and the logo is detected by using the mark identifier 141. In the modification, a mode will be described in which not the logo but a characteristic shape possessed by the commodity is regarded as the mark and it is detected whether or not the commodity has a commodity shape that the mark identifier 141 has learned.

Figure 9:
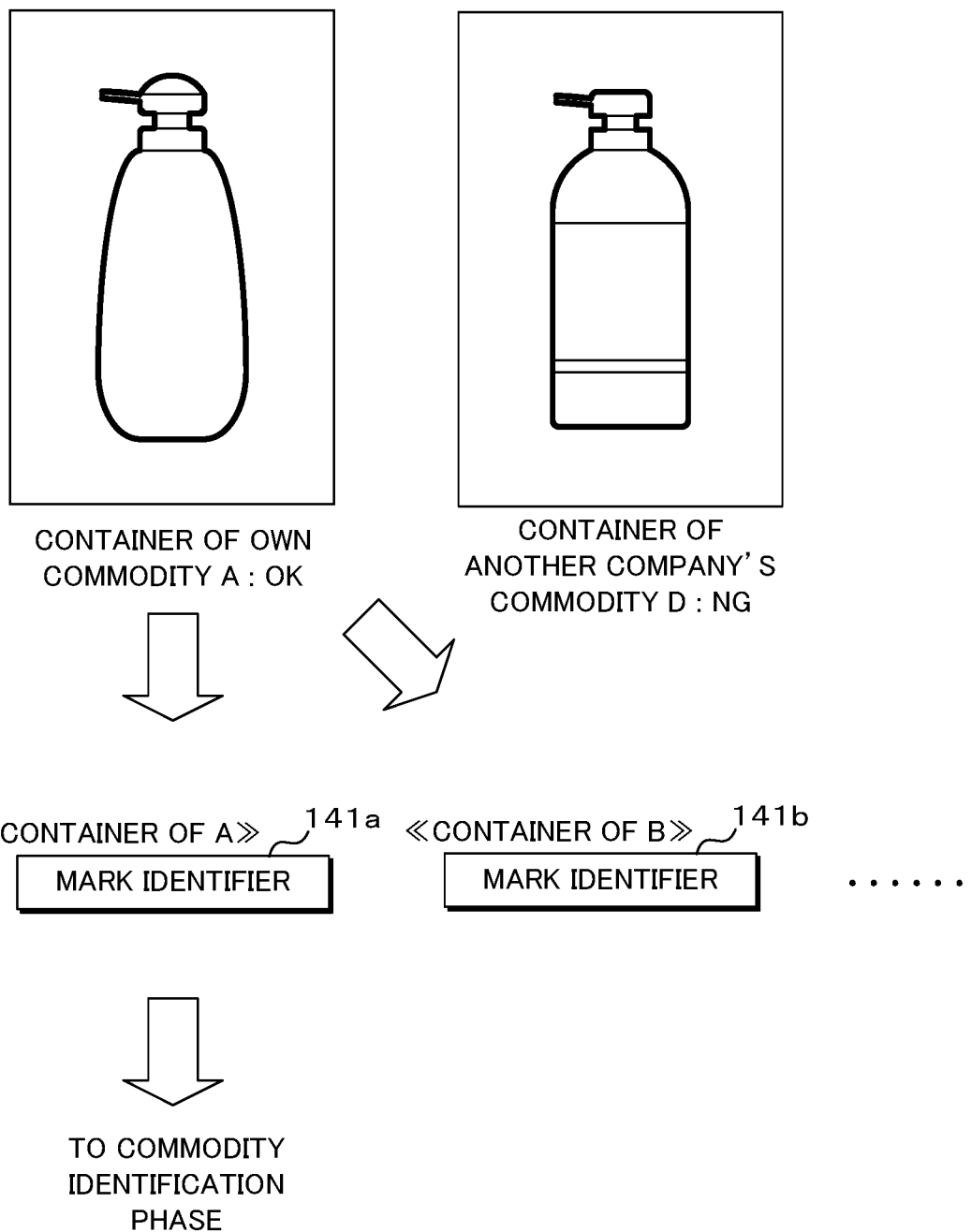
FIG. 9 An explanatory view showing a general outline of a modification.

FIG. 9 is an explanatory view showing a general outline of the modification. FIG. 9 illustrates a manner in which whether the commodity is a registered commodity such as the company's own commodity or not is determined based on the shape (shown by the thick lines in FIG. 9) of the container of the imaged commodity.

In the modification, the server 1 has previously performed learning processing to learn the shape of the commodity container from the teacher image and generated the mark identifier 141 to detect (identify) the shape of a specific commodity container from the taken image. For example, the server 1 has generated mark identifiers 141a, 141b, . . . of commodities A, B, . . . in a unit such as for each commodity group or for each commodity.

The server 1 inputs the taken image obtained from the terminal 2 to the mark identifiers 141, and determines whether or not the container of the imaged commodity has a shape that has been learned as a mark. By doing this, the server 1 determines whether it is a commodity having the company's own mark or not. For example, as shown in FIG. 9, when a taken image of the company's own commodity A is inputted to the commodity identifiers 141, the shape of the container of the commodity A is detected from this image and it is determined that it has a commodity shape corresponding to the mark. Consequently, the server 1 inputs the image to the succeeding commodity group identifier 142, and performs identification of each commodity as in the above-described embodiment. On the other hand, as shown in FIG. 9, when a taken image of a commodity D which is another company's commodity is inputted since none of the commodity identifiers 141 detects the commodity shape corresponding to the mark, the image is excluded from the target of processing.

As described above, the mark is not limited to a logo such as characters, figures or symbols and may be the shape of the commodity itself.

Although not particularly described, the shape of the commodity detected by the mark identifier 141 as the mark may be not only the overall shape of the commodity but also the shape of a part of the commodity. For example, in the above-described example, when the cap part of the container has a characteristic shape, whether the commodity has the mark or not may be determined based on the shape of only the cap part. As described above, the mark detected by the mark. identifier 141 may be either the overall shape of the commodity or the shape of a part thereof.

Figure 10:
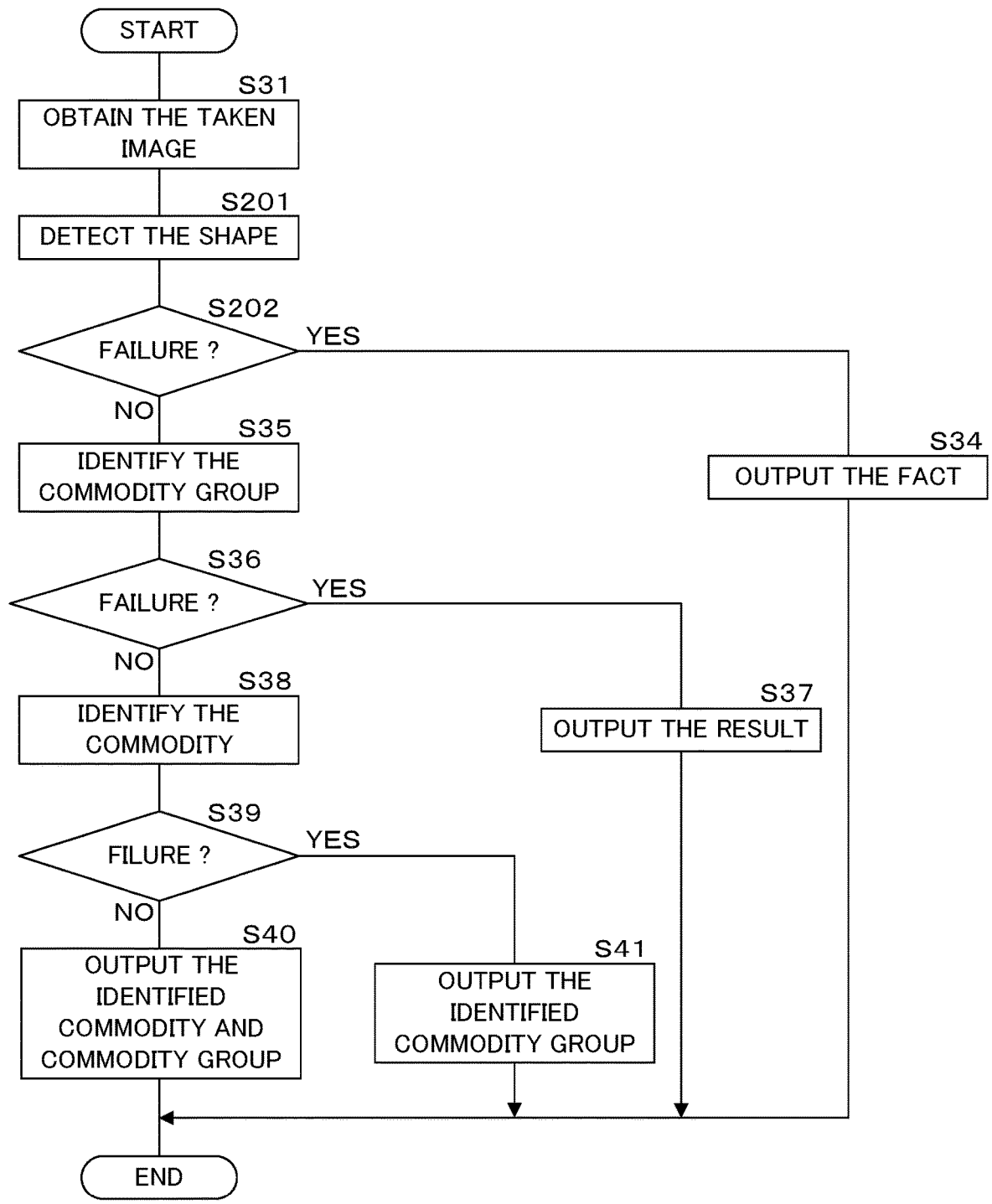
FIG. 10 A flowchart showing an example of the procedure of commodity identification processing of the modification.

FIG. 10 is a flowchart showing an example of the procedure of the commodity identification processing according to the modification, After obtaining an image obtained by imaging the commodity container (step S31), the control portion 11 of the server 1 executes the following processing: By using the mark identifier 141 having learned the shape of the commodity container, the control portion 11 detects the shape of the commodity corresponding to the mark from the taken image (step S201). The control portion 11 determines whether the detection of the commodity shape corresponding to the mark is a failure or not (step S202). When the detection of the shape corresponding to the mark is a failure (S202:YES), the control portion 11 shifts the process to step S34. When the detection of the shape corresponding to the mark is not a failure (step S202: NO), the control portion 11 shifts the process to step S35.

By the above, in identifying the commodity from the taken image, the image to be processed can be narrowed down by the shape of the commodity.

Figure 11:
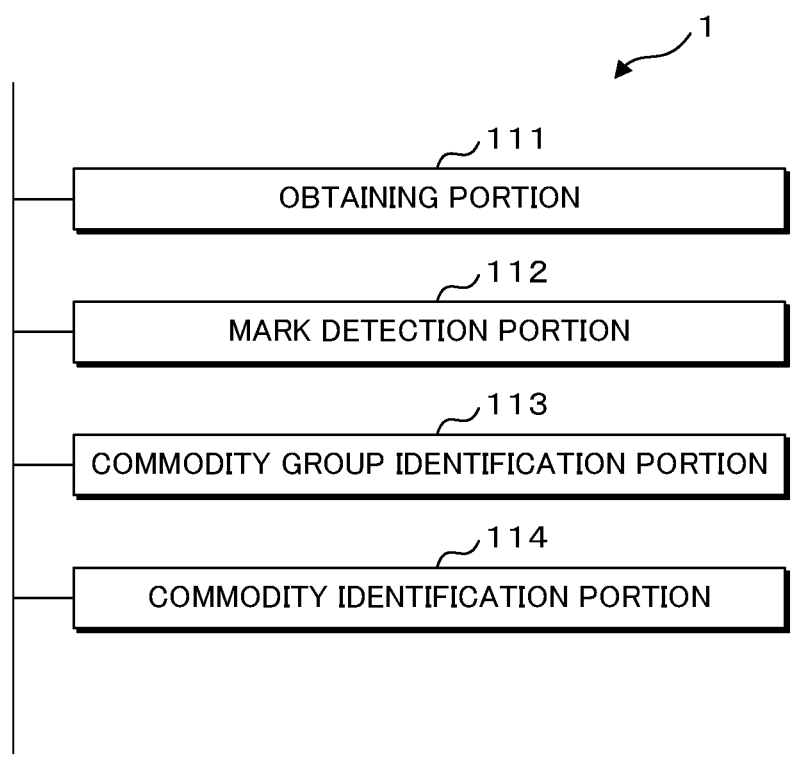
FIG. 11 A functional block diagram showing the operation of a server of the above-described mode.

FIG. 11 is a functional block diagram showing the operation of the server 1 of the above-described mode. By the control portion 11 executing the program P, the server 1 operates as follows: An obtaining portion 111 obtains the taken image. A mark detection portion 112 determines whether the commodity is a commodity having the corresponding mark or not by using the mark detector on the obtained taken image. On the taken image where the mark is detected, a commodity group identification portion 113 identifies to which of a plurality of commodity groups the commodity belongs by using the first neural network having learned the commodity having the mark. A commodity identification portion 114 identifies the commodity by using the second neural network having performed learning for each of the plurality of commodities.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A commodity identification device comprising:
   one or more processing devices; and
   one or more storage devices storing instructions for causing the one or more processing devices to:
   obtain a taken image;
   extract a local feature amount representative of a brightness gradient of the taken image;
   determine whether a commodity is provided with a corresponding mark or not by detecting the mark from the extracted local feature amount by using a mark detector having learned an identification boundary that identifies the target mark in a feature space;
   identify which of a plurality of commodity groups a commodity provided with the mark belongs to by using a first neural network having learned the commodity, on the taken image where the mark is detected; and
   identify the commodity by using a second neural network having performed learning for each of the commodity groups.

2. The commodity identification device according to claim 1, wherein the instructions further cause the one or more processing devices to:
   output an identification result after the commodity group and the commodity are identified.

3. The commodity identification device according to claim 2, wherein the instructions further cause the one or more processing devices to:
   when the identification of the commodity fails, output the identification result related to the commodity group.

4. The commodity identification device according to claim 1, wherein
   the mark is a shape of the commodity, and
   the instructions further cause the one or more processing devices to: determine whether the commodity provided with the mark or not based on whether the shape of the commodity is detected from the taken image by using the mark detector or not.

5. A non-transitory computer-readable storage medium that causes a computer to execute processing of:
   obtaining a taken image;
   extracting a local feature amount representative of a brightness gradient of the taken image;
   determining whether a commodity is provided with the mark or not by detecting the mark from the extracted local feature amount by using a mark detector having learned an identification boundary that identifies the target mark in a feature space;
   identifying which of a plurality of commodity groups a commodity provided with the mark belongs to by using a first neural network having learned the commodity, on the taken image where the mark is detected; and
   identifying the commodity by using a second neural network having performed learning for each of the commodity groups.

6. A learning method causing a processor to execute processing of:
   obtaining, by the processor, training data including an image for training obtained by imaging a commodity and information representative of the commodity, a commodity group to which the commodity belongs and a mark possessed by the commodity;
   generating, by the processor, a support vector machine that identifies the mark based on the training data;
   generating, by the processor, a first neural network that identifies the commodity group, based on the training data; and
   generating, by the processor, a second neural network that identifies the commodity, based on the training data.

* * * * *